United States Patent
Taneda

(10) Patent No.: US 7,309,074 B2
(45) Date of Patent: Dec. 18, 2007

(54) STABILIZER CONTROL DEVICE

(75) Inventor: Akiya Taneda, Anjo (JP)

(73) Assignee: Aisin Seiki Kabushiki Kaisha, Kariya-shi, Aichi-ken (JP)

(*) Notice: Subject to any disclaimer, the term of this patent is extended or adjusted under 35 U.S.C. 154(b) by 182 days.

(21) Appl. No.: 11/183,902

(22) Filed: Jul. 19, 2005

(65) Prior Publication Data

US 2006/0017251 A1   Jan. 26, 2006

(30) Foreign Application Priority Data

Jul. 20, 2004   (JP) ............................ 2004-211860

(51) Int. Cl.
*B60G 21/055* (2006.01)

(52) U.S. Cl. .................. 280/124.107; 280/124.106; 280/5.508

(58) Field of Classification Search ............ 280/5.511, 280/5.508, 124.107, 124.106, 124.152
See application file for complete search history.

(56) References Cited

U.S. PATENT DOCUMENTS

| | | | |
|---|---|---|---|
| 5,527,061 A | 6/1996 | Karl | |
| 5,700,027 A | 12/1997 | Schiffler | |
| 6,425,585 B1 | 7/2002 | Schuelke et al. | |
| 6,428,019 B1* | 8/2002 | Kincad et al. | 280/5.511 |
| 6,513,819 B1* | 2/2003 | Oliver et al. | 280/124.152 |
| 6,637,757 B2* | 10/2003 | Ignatius et al. | 280/5.511 |
| 6,698,767 B2* | 3/2004 | Hagan | 280/5.511 |

2002/0180167 A1   12/2002   Schmidt et al.

FOREIGN PATENT DOCUMENTS

| | | |
|---|---|---|
| DE | 4443809 | 4/1996 |
| DE | 19850169 | 7/2000 |
| JP | 09142322 | 6/1997 |
| JP | 2000039027 | 2/2000 |
| JP | 10242552 | 3/2004 |
| JP | 2004-314947 | 11/2004 |
| WO | 2004/085179 A1 | 10/2004 |

OTHER PUBLICATIONS

European Search Report dated Jan. 4, 2006.
Kiyoshi Ogawa et al., "Mechanism", Morikita Shuppan Co., Ltd., Published Mar. 1, 1976, 1st edition, 7th printing, pp. 164-165.
"Principles of the Harmonic Drive Mechanism", retrieved from the Internet: URL: http://www.hds.co.jp/principle, Harmonic Drive Systems, Inc., retrived on Feb. 13, 2004.

* cited by examiner

*Primary Examiner*—Ruth Ilan
*Assistant Examiner*—Tiffany L. Webb
(74) *Attorney, Agent, or Firm*—Buchanan Ingersoll & Rooney PC

(57) ABSTRACT

A stabilizer control device comprises a pair of a first stabilizer bar and a second stabilizer bar, an actuator the actuator including a first member and a second member, the first member including a bearing portion to which the first stabilizer bar is connected, the second member to which the second stabilizer bar is connected so as to generate a rotation relative to the first member, a spline shaft portion having a first external spline formed on the first stabilizer bar, an internal spline formed on an inner peripheral surface of the bearing portion of the first member, a groove portion is formed on a part of the spline shaft portion, and a toothed elastic member provided in the groove portion so as to fit to the internal spline of the bearing portion.

4 Claims, 5 Drawing Sheets

STABILIZER CONTROL DEVICE

CROSS REFERENCE TO RELATED APPLICATIONS

This application is based on and claims priority under 35 U.S.C. § 119 to Japanese Patent Application 2004-211860, filed on Jul. 20, 2004, the entire content of which is incorporated herein by reference.

FIELD OF THE INVENTION

The present invention generally relates to a stabilizer control device for a vehicle. More specifically, the present invention relates to the stabilizer control device for variably controlling a torsion force on a stabilizer provided between right and left wheels.

BACKGROUND

Generally, a stabilizer control device for a vehicle is used to stabilize the vehicle, while the vehicle is turning, by applying an appropriate roll moment to the vehicle by use of an actuation of the stabilizer bar in order to reduce or prevent a rolling on the vehicle. For example, a known rotary actuator disclosed in JP2775242B2 (corresponding to U.S. Pat. No. 5,700,027A) controls a stabilizer by which torsion bar halves are connected each other, and such rotary actuator is driven by hydraulic fluid under pressure. Further, a roll stabilization of a vehicle disclosed in JP2002-518245A (corresponding to U.S. Pat. No. 6,425,585B1) includes an electromechanical slewing actuator arranged between stabilizer halves. Specifically, a motor and a speed reducing gear device are provided between stabilizer halves. Further more, another type of stabilizer disclosed in JP2003-519588A (corresponding to U.S. 2002-180167A1) includes stabilizer halves formed by bending, and an actuator. The actuator is comprised of an electric motor and a speed reducing gear mechanism and mounted between the stabilizer halves.

The speed reducing gear mechanism includes a general multistage planetary gear mechanism. Specifically, a paradoxical planetary gear mechanism is known as a speed reducing mechanism, which can obtain a large reduction ratio.

Such planetary gear mechanism is described in a document *Mechanism*, Kiyoshi Ogawa and Isao Kato, Morikita Shuppan Co., Ltd., Published Mar. 1, 1976, 1st edition, 7th printing, 164-165 (hereinbelow referred to as Document 1). In Document 1, the planetary gear mechanism includes a pair of internal sun gears (a static sun gear and a rotational sun gear), and one of the sun gears meshes with planetary gears, and the other of the sun gears also meshes with the same planetary gears. Further, another speed reducing mechanism, by which a greater reduction ratio can be obtained, is described as Harmonic Drive® (registered by Harmonic Drive Systems, Inc) in a document *Principles of the Harmonic Drive* mechanism, retrieved from the Internet: URL: http://www.hds.co.jp/principle (hereinbelow referred to as Document 2).

The actuators disclosed in JP2002-518245A (corresponding to U.S. Pat. No. 6,425,585B1) and JP2003-519588A (corresponding to U.S. 2002-180167A1) are actuated by electric motors, on the other hand, the rotary actuator disclosed in JP2775242B2 (corresponding to U.S. Pat. No. 5,700,027A) is actuated by the hydraulic pressure. According to such rotary actuator, the torsion bar is connected to a rotor shaft of the rotary actuator by means of a spline-fitting. The spline-fitting can be used for another actuator having another structure, however, in any case, it is important that the stabilizer halves are connected to the actuator so as not to generate noise caused by a rattling therebetween while each stabilizer halves rotate relatively. Thus, it is fundamental that the stabilizer halves are spline-fit to the actuator by press fitting.

Furthermore, in the same manner as the stabilizer halves disclosed in U.S. 2002-180167A1 that are bent so as to be in a complex form, the stabilize bar is generally bent so as to be in a complex form. Thus, it is difficult to spline-fit such stabilizer bar by press fitting to a member of the actuator. For example, because the stabilizer bar doesn't include a flat portion, which is used for the spline-fitting with press fitting, and because it is difficult to form such flat portion on the bent stabilizer bar for receiving a large load which is applied to the stabilizer while press-fitting, it becomes difficult to spline-fit the stabilizer bar by press-fitting to the member of the actuator. Furthermore, even when the stabilizer bar is press-fit in the spline hole in a manner where the stabilizer bar is hold by means of a clamp, the stabilizer bar may slip on the clamp, as a result, it becomes difficult that a required press-fitting load is secured. Thus, an additional device, such as a particular press-fitting device may be required to use.

Thus, a need exist to provide a stabilizer control device by which at least either one of a pair of the stabilizer bars can be easy and firmly spline-fit to a component of an actuator, which is used for controlling a torsion force of the stabilizer bar.

SUMMARY OF THE INVENTION

According to an aspect of the present invention, a stabilizer control device comprises a pair of a first stabilizer bar and a second stabilizer bar provided between a right wheel and a left wheel of a vehicle, an actuator for applying a torsion force to the pair of the first stabilizer bar and the second stabilizer bar, the actuator including a first member having a bearing portion to which the first stabilizer bar is connected, a second member to which the second stabilizer bar is connected so as to generate a rotation relative to the first member, a spline shaft portion having a first external spline formed on the first stabilizer bar on one end portion thereof so as to extend in an axial direction, an internal spline formed on an inner peripheral surface of the bearing portion of the first member so as to extend in an axial direction, a groove portion formed on a part of the spline shaft portion so as to extend in an axial direction, and a toothed elastic member provided in the groove portion and having a second external spline so as to fit to the internal spline of the bearing portion.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 7:
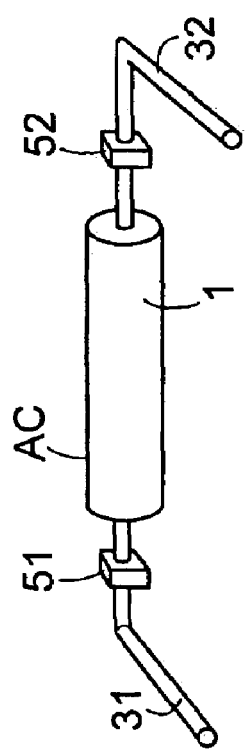

A first embodiment of the present invention will be explained in accordance with drawings attached hereto. FIG. 7 illustrates an appearance of a stabilizer bar provided between front wheels. As shown in FIG. 7, the stabilizer includes a stabilizer bar, a stabilizer actuator and maintaining means 51 and 52. Specifically, the stabilizer bar is divided into a stabilizer bar 31 (first stabilizer bar) and a stabilizer bar 32 (second stabilizer bar), and a first end of the stabilizer bar 31 is connected to, for example a right wheel (not shown), and a first end of the stabilizer bar 32 is connected to, for example a left wheel (not shown). Further, a second end of the stabilizer bar 31 is connected to a second end of the stabilizer 32 within a stabilizer actuator AC (hereinafter referred to as an actuator AC). A configuration of the actuator will be explained later in detail. The stabilizer bar 31 and the stabilizer bar 32 are fixed to a vehicle body (not shown) by means of the maintaining means 51 and 52. In this circumstance, torsion forces applied to the stabilizer bar 31 and the stabilizer bar 32 are variably controlled by means of the actuator AC, as a result, a roll angle of upon the rolling of the vehicle can be reduced.

Figure 1:
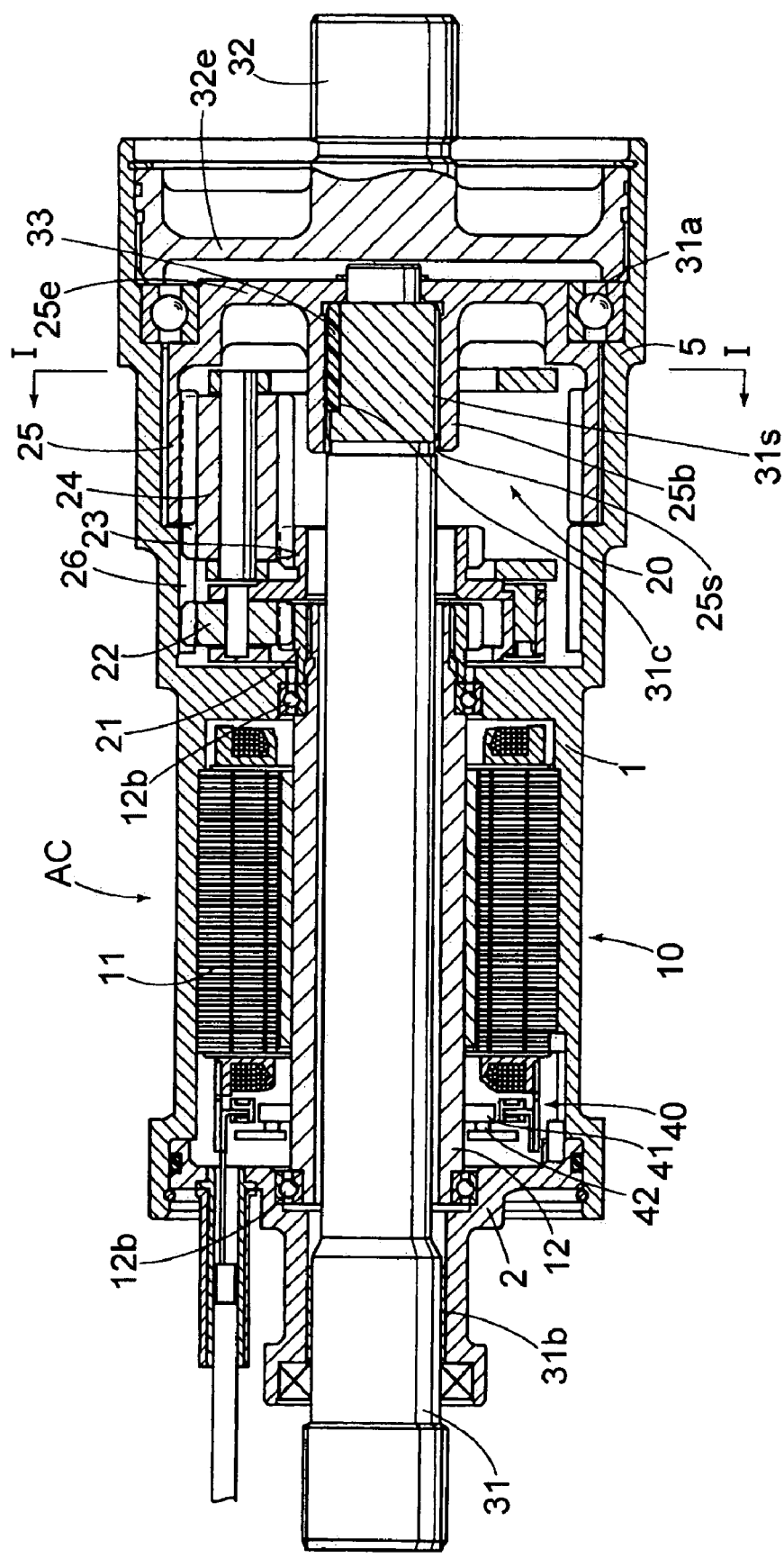
FIG. 1 illustrates a cross section of an actuator AC according to a first embodiment of the present invention.
Figure 2:
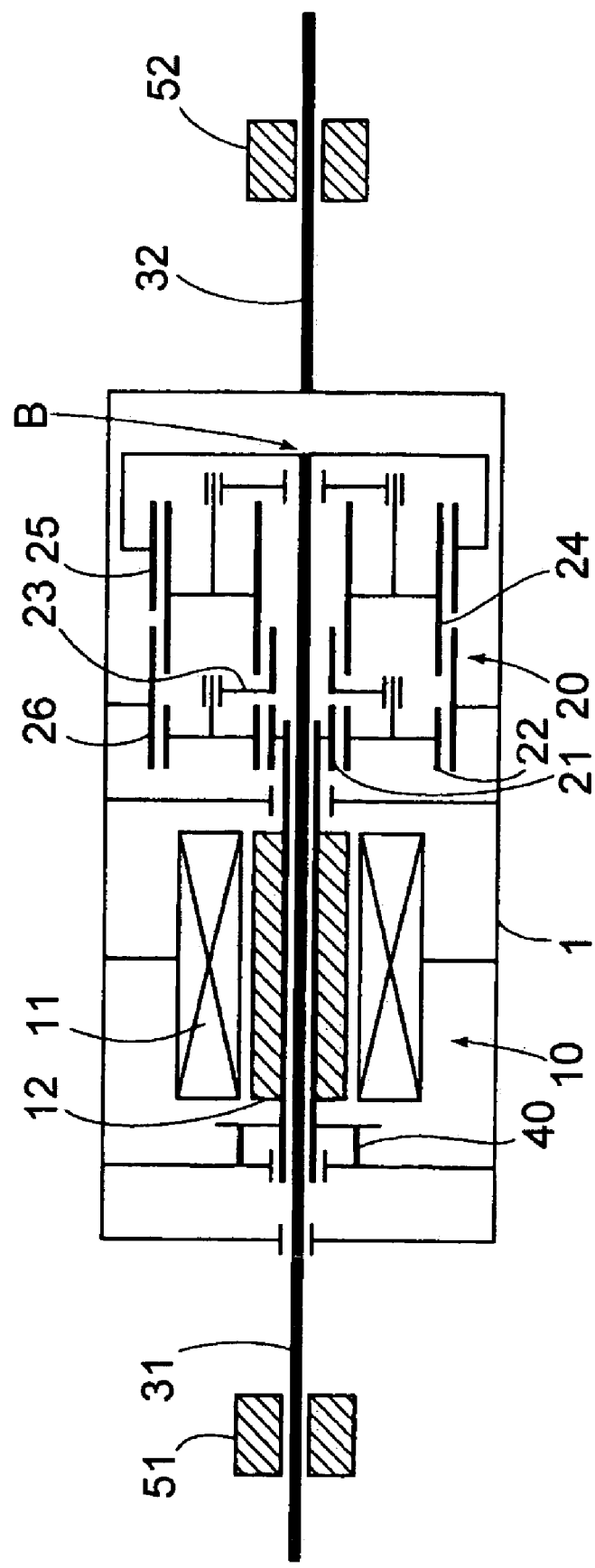
FIG. 2 illustrates a schematic view of the actuator AC according to the first embodiment of the present invention.

Such actuator AC generally includes a motor and a speed reducing mechanism. In the first embodiment, as shown in FIG. 1 and FIG. 2, the actuator AC includes a brushless-type DC motor (brushless motor) 10 and a paradoxical planetary gear mechanism 20. FIG. 1 illustrates a cross section of the actuator AC, and FIG. 2 illustrates a schematic view of the actuator AC. Same component in FIG. 1 and FIG. 2 is indicated by an identical numeral. In the first embodiment, the brushless motor 10 and the paradoxical planetary gear mechanism 20 are integrally housed in a housing 1. In the first embodiment, a three phase brushless motor is used, however, another type of motor may be used. For example, another phase brushless motor or a brush motor may be used alternatively.

In the above paradoxical planetary gear mechanism 20, the stabilizer bar 31 is integrally connected to a ring gear 25, which serves as a first gear (first member), and the stabilizer bar 32 is integrally connected to a ring gear 26, which serves as a second gear (second member). As shown in FIG. 1, the stabilizer bar 31 is spline-fit to a bearing 25b, which is integrally formed on an end plate 25e of the ring gear 25. Thus, as pointed by a letter B in FIG. 2, the stabilizer bar 31 is integrally fit to the ring gear 25, which serves as the first gear. Further, an end plate 32e integrally formed on one end of the stabilizer bar 32 is spline-fit to the housing 1 so as to be fixed thereby. Because the ring gear 26 is integrally formed inside the housing 1, the stabilizer bar 32 is integrally fit to the ring gear 26, which serves as a second gear.

A spline shaft portion 31s having an external teeth portion (first external spline) is formed on an outer peripheral surface of the stabilizer bar 31 on one end thereof (right end portion of the stabilizer bar 31 in FIG. 1) so as to extend a predetermined length in an axial direction. On the other hand, a spline hole 25s having an internal teeth portion (internal spline) is formed on an inner peripheral surface of the bearing 25b of the ring gear 25, which serves as a first gear, so as to extend a predetermined length in an axial direction. In this circumstance, a dimension of the spline shaft portion 31s and a dimension of the spline hole 25s are set so that the spline shaft portion 31s can fit without press-fitting to the spline hole 25s.

Figure 3:
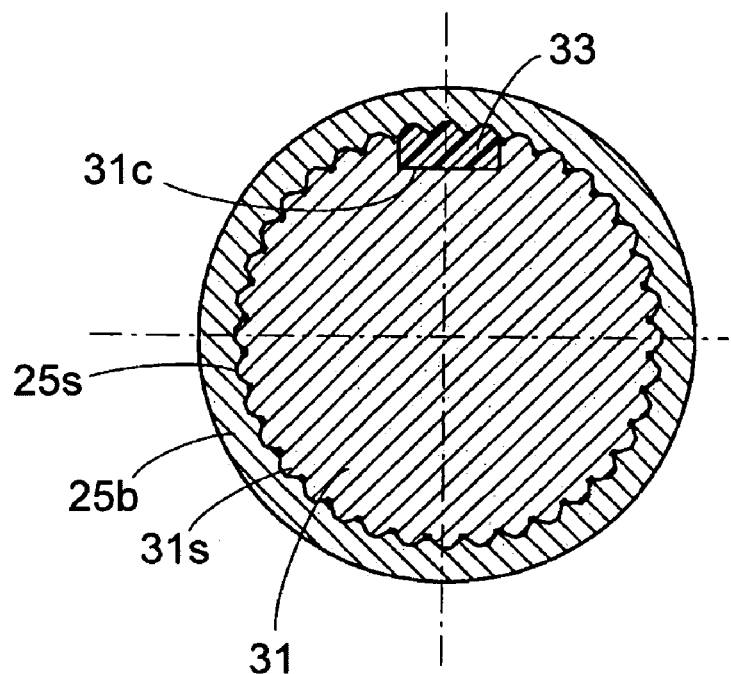
FIG. 3 illustrates a cross section of the stabilizer along I-I line in FIG. 1.
Figure 4:
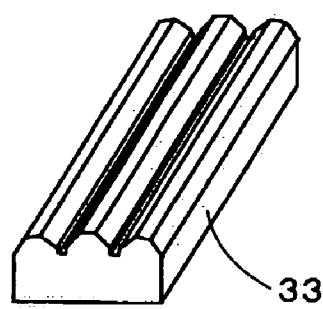
FIG. 4 illustrates an oblique perspective view of a toothed elastic member according to the first embodiment of the present invention.

Further, as shown in FIG. 1 and FIG. 3, a groove portion 31c is formed on a part of the spline shaft portion 31s so as to extend a predetermined length in an axial direction from the end of the spline shaft portion 31s. Further, a toothed elastic member 33 formed as shown in FIG. 4 is fit in the groove portion 31c. Specifically, the toothed elastic member 33 includes an external teeth portion (second external spline), which meshes with the internal teeth portion of the spline hole 25s, and the dimension of the toothed elastic member 33 is slightly larger than the dimension of the external teeth portion of the spline shaft portion 31s. More specifically, the toothed elastic member 33 is made of resin having elasticity, for example a polyester elastomer such as Hytrel® of DU PONT-TORAY CO.,LTD (Hytrel® is a registered trademark of E. I. du Pont de Nemours and Company). The toothed elastic member 33 has a symmetrical cross section, and it is preferable that the toothed elastic member 33 is positioned so that apex portions of each tooth of the toothed elastic member 33 are positioned upon a diameter line of the spline hole 25s.

The toothed elastic member 33 may be made of rubber instead of resin. In addition, either one of fitting or press fitting is used to mount the toothed elastic member 33 into the groove portion 31c in consideration of mountability. Further, in order to prevent the toothed elastic member 33 from being dropped while the spline shaft portion 31s is mounted to the spline hole 25s, it is preferable that the toothed elastic member 33 is press fit to the groove portion 31c.

Thus, in circumstances where the toothed elastic member 33 is press fit into the groove portion 31c of the spline shaft portion 31s of the stabilizer bar 31, the stabilizer bar 31 is inserted into the spline hole 25s of the ring gear 25. At this point, because the toothed elastic member 33 meshes with the internal teeth portion of the spline hole 25s while the toothed elastic member 33 is compressed, the spline shaft portion 31s is pressed in a radial direction thereof by use of an elastic force of the toothed elastic member 33. Thus, the spline shaft portion 31s can be inserted into the spline hole 25s by use of a light force such as a physical force of the human arm, and then the spline shaft portion 31s can fit to the spline hole 25s by use of an elastic force of the toothed elastic member 33 in order to secure an appropriate fitting relationship between the spline shaft portion 31s and the spline hole 25s. Thus, the stabilizer bar 31 can be easy and firmly spline-fit in the ring gear 25, which serves as a first gear, without using a particular device for press-fitting. In circumstance where the stabilizer bar 31 is spline-fit in the ring gear 25, when a rotational torque is applied to the stabilizer bar 31, surfaces of the teeth of the spline shaft portion 31s that are on the side of the rotational direction of the stabilizer bar 31 are engaged with surfaces of the teeth of the spline hole 25s that are on the side of the rotational direction of the ring gear 25, and thus the fitting state between the stabilizer bar 31 and the ring gear 25 can be firmly maintained by means of the spline-fitting.

The ring gear 25 and the ring gear 26 shown in FIG. 1 and FIG. 2 include internal gears, and the number of the internal gear teeth of the ring gear 25 differs from the number of the internal gear teeth of the ring gear 26. For example, the number of the internal gear teeth of the ring gear 25 is 60, and the number of the internal gear teeth of the ring gear 26 is 62. In this circumstance, three planetary gears 24 are meshed with and supported by the ring gear 25 and the ring gear 26 so as to be able to orbit relative to an axis of the stabilizer bar 31 (a paradoxical planetary gear mechanism). In this embodiment, two stages of the planetary gears are used in the paradoxical planetary gear mechanism in consideration of a specification of the brushless motor 10 and a reduction ratio of the speed reducing mechanism. Specifically, the sun gear 21 that is spline-fit to the rotor 12 of the brushless motor 10 is provided so as to mesh with three first stage planetary gears (only one first stage planetary gear 22 is shown in FIG. 1).

More specifically, the first stage planetary gears 22 are supported by the sun gear 23 so as to rotate on its axis and orbit relative to an axis of the stabilizer bar 31 (that means orbit relative to an axis of the sun gear 21 and an axis of the sun gear 23). Further, the first stage planetary gears 22 is positioned so as to mesh with the sun gear 21 and the ring gear 26 as mentioned above, and supported therebetween so as to rotate on its axis and orbit relative to an axis of the stabilizer bar 31. The planetary gears 24 of a second gear are provided so as to mesh with the sun gear 23, the ring gear 25 and the ring gear 26. Specifically, the planetary gears 24 is supported among the sun gear 23 and the ring gears 25 and 26 so as to rotate on its axis and orbit relative to an axis of the stabilizer bar 31.

The paradoxical gear mechanism (also known as a Ferguson's mechanical paradox) described in Document 1 is used as only a speed reducing mechanism, however, the paradoxical gear mechanism in this embodiment is connected to the brushless motor 10 in order to output a drive by which the ring gear 25 and the ring gear 26 (the stabilizer bar 31 and the stabilizer 32) are relatively rotate. Specifically, the static sun gear described in Document 1 structurally corresponds to the ring gear 26 in this embodiment, and the rotational sun gear described in Document 1 structurally corresponds to the ring gear 25, however, an input-output relationship of this embodiment differs from that of Document 1.

As shown in FIG. 1 and FIG. 2, the brushless motor 10 includes a stator 11 and a hollowed rotor 12. The rotor 12 is supported by the stabilizer bar 31 so as to rotate relative to the stabilizer bar 31, and the stator 11 is fixed to an inner surface of the housing 1 so as to surround the rotor 12. The rotor 12 includes a cylindrical member and a magnet having multiple magnetic pole (not shown), and as shown in FIG. 1, both ends of the rotor 12 is rotatably supported by the housing 1 and the cover member 2 at inner surfaces thereof by means of bearings 12*b*. In this circumstance, the stabilizer bar 31 is inserted into the hollowed portion of the rotor 12.

The stabilizer bar 31 is fit to the ring gear 25 serving as a first gear, and the ring gear 25 is rotatably supported by the housing 1 at the inner surface thereof by means of a bearing 31*a*. Further, the stabilizer bar 31 is rotatably supported by the cover member 2 at an inner surface thereof by means of a bearing 31*b*. In this embodiment, the cover member 2 is formed independently from the housing 1; however, the cover member 2 may be formed integrally with the housing 1. Further, a sensor 40 is provided within the housing 1 in order to detect rotations of the stabilizer bar 31. The sensor 40 in this embodiment is comprised of a magnet 41 and a hole IC 42. Specifically, the magnets 41 magnetized so as to be identical with the magnet of the rotor 12 are provided on an outer peripheral surface of the rotor 12 so as to be in a ring shape, and the hole IC 42 is supported by the housing 1 so as to face the magnets 41. Alternatively, another type of sensor, such as an optical rotary encoder, may be used as the sensor 40.

Figure 5:
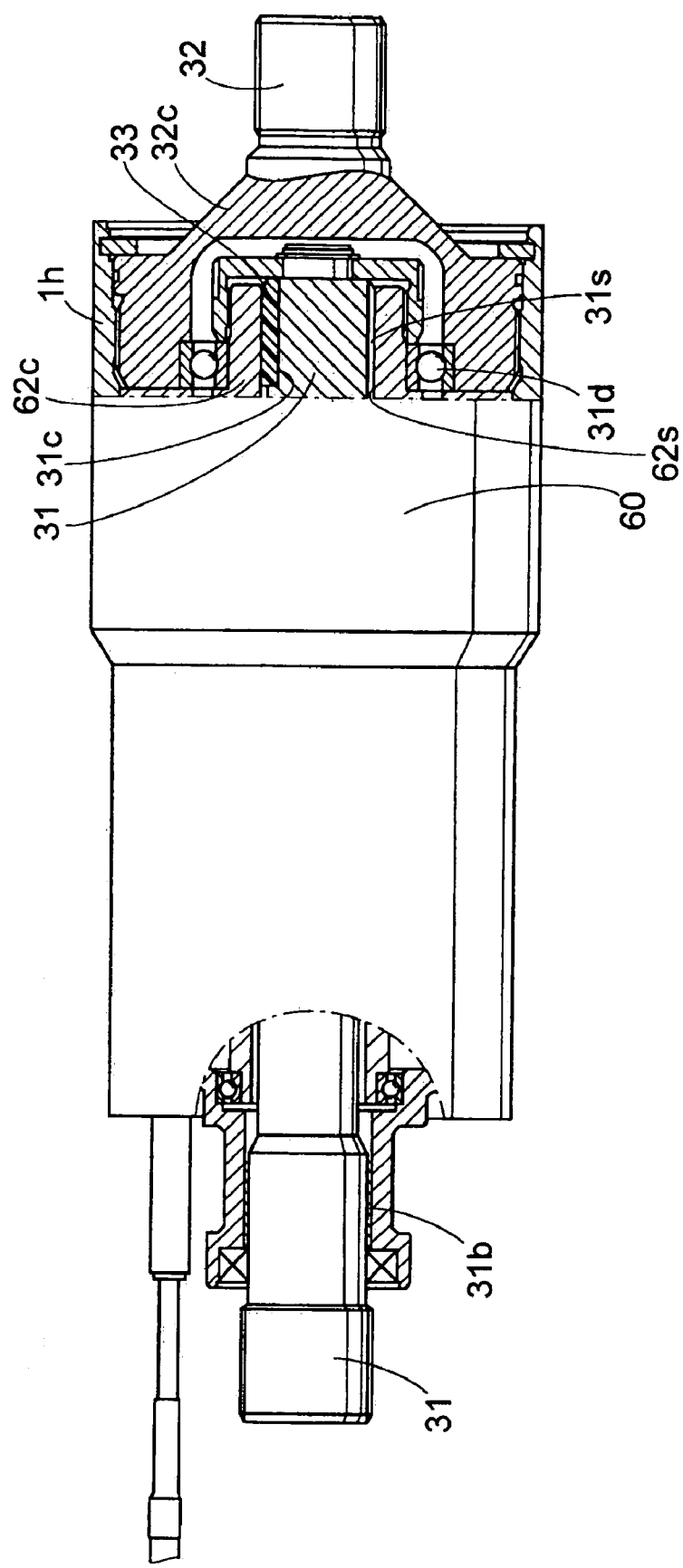
FIG. 5 illustrates a partial cross section indicating a structure of an actuator according to a second embodiment of the present invention.
Figure 6:
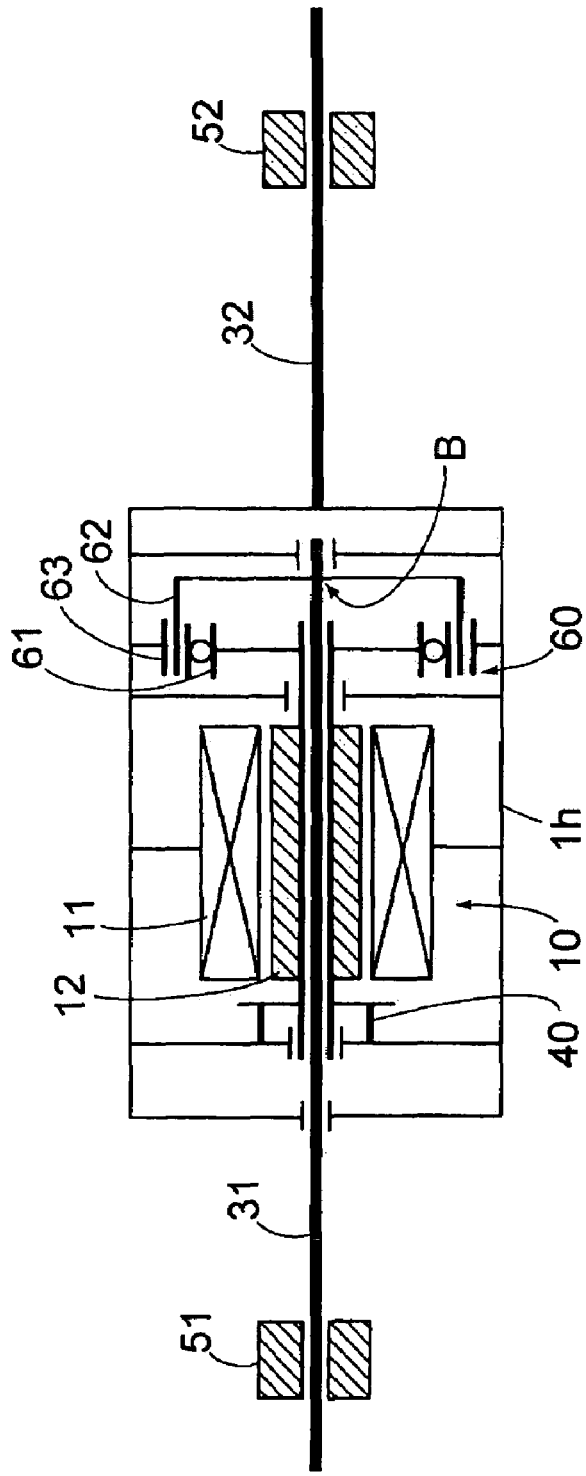
FIG. 6 illustrates a schematic view indicating the actuator according to the second embodiment of the present invention and FIG. 7 illustrates an oblique perspective view of the stabilizer control device according to the embodiments of the present invention.

A second embodiment of the actuator according to the present invention will be explained in accordance with FIG. 5 and FIG. 6. In the second embodiment, the brushless motor 10, which is a same type of brushless motor used in the first embodiment, is used. On the other hand, as a speed reducing mechanism, a gear mechanism 60 such as Harmonic Drive® (registered trademark of Harmonic Drive Systems,Inc.) is used in the second embodiment. These components are integrally housed in the housing 1*h*. FIG. 5 illustrates a cross section indicating a part of a cross section of the actuator in the second embodiment, and FIG. 6 illustrates a schematic view of the actuator in FIG. 5.

The gear mechanism 60 includes a flexible gear 62 serving as a first gear and a ring gear 63 serving as a second gear, and the stabilizer bar 31 is integrally fit to the flexible gear 62, and the stabilizer bar 32 is integrally fit to the ring gear 63. The flexible gear 62 corresponds to "Flexspline" in Document 2. On the other hand, the ring gear 63 corresponds to "circular spline" in Document 2. Flexspline is a curtailed word indicating a flexible spline member.

Specifically, as shown in FIG. 5, a bearing 62*c* of the flexible gear 62 that is spline-fit to the stabilizer bar 31 is supported by the fit end portion 32*c* of the stabilizer bar 32 by means of a bearing 31*d* so as to be rotatable relative to the fit end portion 32*c* of the stabilizer bar 32. Further, the fit end portion 32*c* of the stabilizer bar 32 is spline-fit in the housing 1*h* so as to be fixed. Thus, the stabilizer bar 31 penetrates through the rotor (not shown in FIG. 5) and is supported by the bearing 62*c* of the flexible gear 62 so as to be rotatable relative to the housing 1*h*.

A spline shaft portion 31*s* having an external teeth portion is formed on an outer peripheral surface of the stabilizer bar 31 on one end thereof (right end portion of the stabilizer bar 31 in FIG. 5) in an axial direction so as to extend a predetermined length. On the other hand, a spline hole 62*s* having an internal teeth portion is formed on an inner peripheral surface of the bearing 62*c* of the flexible gear 62, which serves as a first gear, in an axial direction so as to extend a predetermined length. In this circumstance, a dimension of the spline shaft portion 31*s* and a dimension of the spline hole 62*s* are set so that the spline shaft portion 31*s* is fit without press-fitting to the spline hole 62*s*.

Further, as shown in FIG. 5 and FIG. 3, a groove portion 31*c* is formed on a part of an outer surface of the spline shaft portion 31*s* so as to extend a predetermined length in an axial direction from the end of the spline shaft portion 31*s*. A toothed elastic member 33 formed as shown in FIG. 4 is fit or press-fit in the groove portion 31*c*. Specifically, the toothed elastic member 33 includes an external teeth portion, which meshes with the internal teeth portion of the spline hole 62*s*. The dimension of the toothed elastic member 33 is slightly larger than the dimension of the external teeth portion of the spline shaft portion 31*s*. More specifically, the spline shaft portion 31*s* is made of resin having elasticity, for example, a polyester elastomer such as Hytrel® of DU PONT-TORAY CO.,LTD (Hytrel® is a registered trademark of E. I. du Pont de Nemours and Company). The toothed elastic member 33 has a symmetrical cross section, and it is preferable that the toothed elastic member 33 is positioned so that apex portions of each teeth of the toothed elastic member 33 are positioned upon a diameter line of the spline hole 62*s*.

Thus, in circumstances where the toothed elastic member 33 is press fit into the groove portion 31c of the spline shaft portion 31s, the stabilizer bar 31 is inserted into the spline hole 62s of the flexible gear 62, and at this point, because the toothed elastic member 33 meshes with the internal teeth portion of the spline hole 62s while the toothed elastic member 33 is compressed, the spline shaft portion 31s is pressed in a radial direction thereof by use of an elastic force of the toothed elastic member 33. Thus, the spline shaft portion 31s can be inserted into the spline hole 25s by use of a light force such as a physical force of the human arm, and then the spline shaft portion 31s can fit to the spline hole 62s by use of an elastic force of the toothed elastic member 33 so as to be integral as pointed by a letter B in FIG. 6. Thus, the stabilizer bar 31 can be easy and firmly spline-fit in the flexible gear 62. In circumstance where the stabilizer bar 31 is spline-fit in the flexible gear 62, when a rotational torque is applied to the stabilizer bar 31, surfaces of the teeth of the spline shaft portion 31s that are on the side of the rotational direction of the stabilizer bar 31 are engaged with surfaces of the teeth of the spline hole 62s that are on the side of the rotational direction of the flexible gear 62, and thus the fitting state by means of the spline-fit between the stabilizer bar 31 and the flexible gear 62 can be firmly maintained.

On the other hand, as shown in FIG. 6, the ring gear 63 is fixed to the housing 1h, and the rotor 12 of the brushless motor 10 is integrally fit to an elliptic gear 61 so as to work in conjunction with the flexible gear 62.

The elliptic gear 61 corresponds to wave generator in Document 2, and the wave generator, the flexible gear 62 and the ring gear 63 are described in Document 2 as follow. The wave generator is a component having small ball bearings built into an outer circumference of an elliptical cam. An outer raceway is subjected to elastic deformation via the ball bearings. A flexspline that corresponds to the flexible gear 62 is a thin cup-shaped metal rim component with external teeth.

A circular spline that corresponds to the ring gear 63 is a rigid steel ring with internal teeth. The circular spline has two more teeth than the flexspline. In circumstances where wave generator is attached to an input shaft, and the flexspline is attached to the output shaft, and when wave generator is rotated; the flexspline having smaller number of teeth rotates so as to mesh with the teeth of circular spline so that the speed can be reduced. Harmonic drive mechanism described in Document 2 is used as only a speed reducing mechanism, however, the paradoxical gear mechanism in this embodiment is connected to the brushless motor 10 in order to output a drive by which the flexible gear 62 and the ring gear 63 (the stabilizer bar 31 and the stabilizer 32) relatively rotate, however, an input-output relationship of this embodiment differs from that of Document 2.

According to the present invention, a stabilizer control device comprises a pair of a first stabilizer bar (31) and a second stabilizer bar (32) provided between a right wheel and a left wheel of a vehicle, an actuator (AC) for applying a torsion force to the pair of the first stabilizer bar (31) and the second stabilizer bar (32), the actuator (AC) including a first member (25) and a second member (26), the first member (25) including a bearing portion (25b) to which the first stabilizer bar (31) is connected, the second member (26) to which the second stabilizer bar (32) is connected so as to generate a rotation relative to the first member (25), a spline shaft portion (31s) having a first external spline formed on the first stabilizer bar (31) on one end portion thereof so as to extend a predetermined length in an axial direction, an internal spline (25s) formed on an inner peripheral surface of the bearing portion (26b) of the first member (25) so as to extend a predetermined length in an axial direction, a groove portion (31c) is formed on a part of the spline shaft portion (31s) so as to extend a predetermined length in an axial direction from the end of the spline shaft portion (31s), a toothed elastic member (33) provided in the groove portion (31c) and having a second external spline so as to fit to the internal spline (25s) of the bearing portion (25b).

Thus, the stabilizer bar can be easy and firmly spline-fit in the first member without using a particular device for press-fitting. In circumstance where the stabilizer bar is spline-fit in the first member, when a rotational torque is applied to the stabilizer bar, surfaces of the teeth of the spline shaft portion that are on the side of the rotational direction of the stabilizer bar are engaged with surfaces of the teeth of the spline hole that are on the side of the rotational direction of the first member, and thus the fitting state by means of the spline-fit between the stabilizer bar and the first member can be firmly maintained.

According to the present invention, the speed reducing mechanism (20) comprises a pair of a first internal gear of the first gear (25) and a second internal gear of the second gear (26), the number of teeth of the first internal gear differs from the number of the teeth of the second internal gear, and a paradoxical planetary gear mechanism in which a planetary gear meshes with both the first internal gear and the second internal gear. Further, in the speed reducing mechanism (20), the first gear (25) meshes with the second gear (26). Thus, the stabilizer control device can be reduced in size and weight, and can obtain a large reduction ratio.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A stabilizer control device having a first stabilizer bar and a second stabilizer bar provided between a right wheel and a left wheel of a vehicle and an actuator for applying a torsion force to the first stabilizer bar and the second stabilizer bar, comprising:

the actuator comprising a motor and a speed reducing mechanism, the speed reducing mechanism comprising a first gear including a bearing portion to which the first stabilizer bar is connected and a second gear to which the second stabilizer bar is connected to generate rotation relative to the first gear, a spline shaft portion having a first external spline formed on the first stabilizer bar on one end portion thereof so as to extend in an axial direction;

an internal spline formed on an inner peripheral surface of the bearing portion of the first gear so as to extend in an axial direction;

a groove portion formed on a part of the spline shaft portion so as to extend in an axial direction;

a toothed elastic member provided in the groove portion and having a second external spline so as to fit to the internal spline of the bearing portion; and the speed reducing mechanism comprising:

a first internal gear of the first gear and a second internal gear of the second gear, in which the number of the teeth of the first internal gear differs from the number of the teeth of the second internal gear; and a paradoxical planetary gear mechanism in which a planetary gear meshes with both the first internal gear and the second internal gear.

2. A stabilizer control device according to claim 1, wherein a dimension of the second external spline of the toothed elastic member is larger than a dimension of the first external spline formed on the one end portion of the first stabilizer bar.

3. A stabilizer control device according to claim 1, wherein the first external spline is formed so as to extend a predetermined length in an axial direction from an end of the first stabilizer bar; and the groove portion is formed so as to extend a predetermined length in an axial direction from the end of the spline shaft portion.

4. A stabilizer control device according to claim 1, wherein the toothed elastic member presses the spline shaft portion in a radial direction by an elastic force thereof.

* * * * *